July 25, 1939. D. H. HARNLY 2,166,993
WEATHERPROOFING STRUCTURE FOR DOORS
Filed Aug. 30, 1937
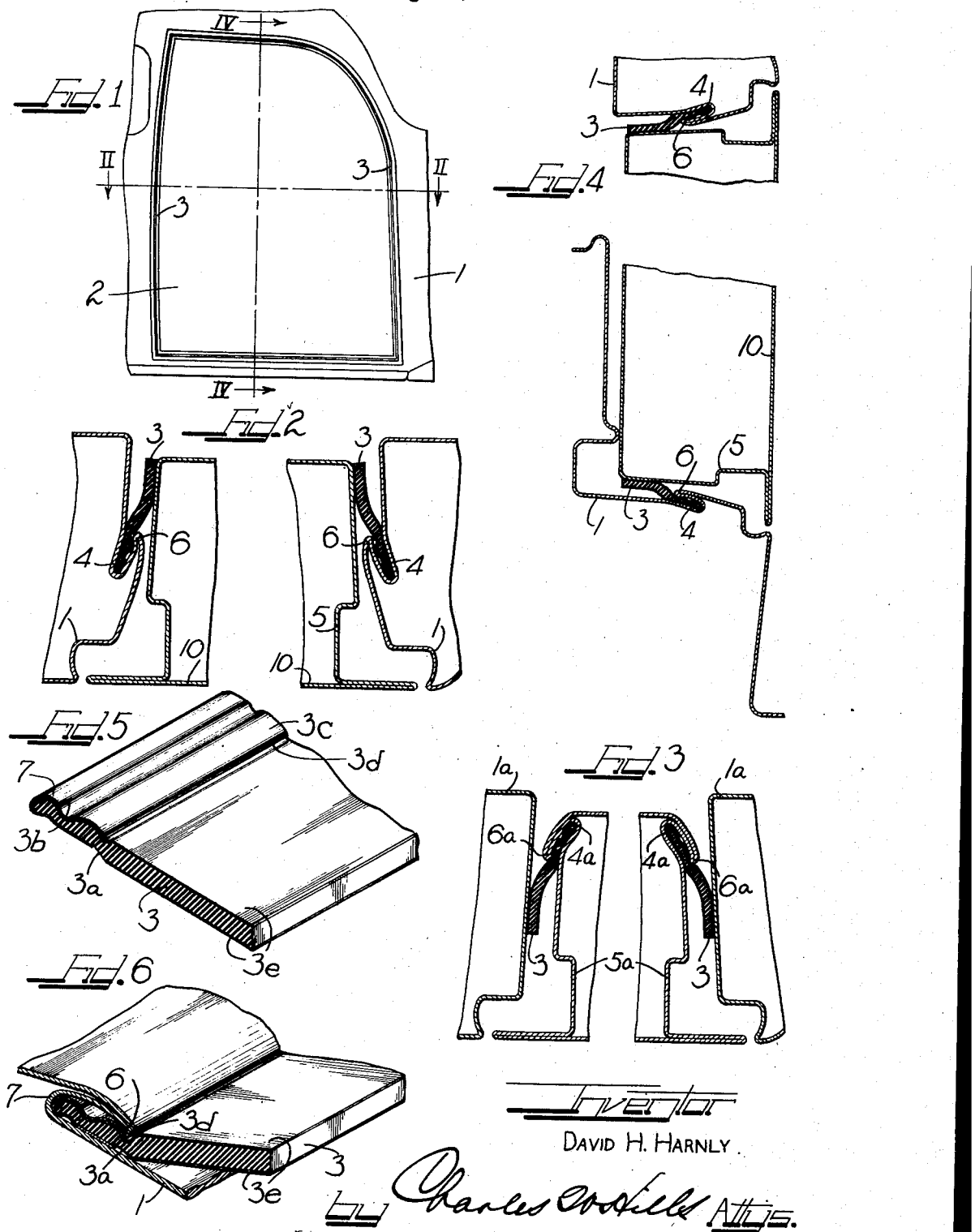
Inventor
DAVID H. HARNLY Patented July 25, 1939

2,166,993

UNITED STATES PATENT OFFICE 2,166,993

WEATHERPROOFING STRUCTURE FOR DOORS

David H. Harnly, Chicago, Ill.; Willard R. Matheny administrator of said David H. Harnly, deceased Application August 30, 1937, Serial No. 161,592

8 Claims. (Cl. 20—69)

This invention relates to weather proofing structure for doors, especially car or automobile doors.

It is well known that due to weather and severe usage, the tolerance of car doors varies. If the doors swell, it is necessary to use considerable force to compress the weather strips now in use in closing the doors. On the other hand, if the door shrinks, the weather strips may not be compressed and may not form an effective seal when the door is closed.

It is among the objects of this invention to overcome the above noted objections in the provision of a novel weather proofing structure that will form an effective seal for any door tolerance that may occur, and that will require little, if any, extra force in closing a door, should the tolerance be materially decreased due to swelling of the door or the like.

These objects are attained in the use of a resilient rubber weather strip having a contact portion that is maintained at an angle with respect to the surface upon which it is secured so that when the door is closed, the weather strip will be deflected instead of being compressed. In mounting the weather strip with its contacting portion at an angle so that a deflection will occur instead of a compression when the door is closed, a wide range of tolerance can be provided for without decreasing the sealing effect of the weather proofing structure.

With these and other objects in view, the invention comprises the novel structure and combination of parts hereinafter described and more particularly pointed out and defined in the appended claims.

In the accompanying drawing which illustrates a preferred form of this invention, and in which similar reference numerals refer to similar features in the different views:

Figure 1 is an elevational view of a door frame with the door removed and embodying a weather proofing structure involving this invention.

Figure 2 is a broken and enlarged sectional view taken upon the line II—II of Figure 1, showing the car door in position.

Figure 3 is a view similar to Figure 2 but illustrating the weather proofing structure applied upon the edge faces of the door.

Figure 4 is an enlarged and broken sectional view taken upon the line IV—IV of Figure 1, with the door in place.

Figure 5 is an enlarged perspective view of a weather strip that may be used in connection with this invention.

Figure 6 is an enlarged perspective view of the weather strip as applied to a door or door frame.

In the drawing, which illustrates a preferred form of this invention, I have illustrated the weather proofing structure as applied to a car or automobile door and have shown that the weather strips may be equally well attached to either the door or door frame.

In Figure 1, there is shown the frame or framework 1 that surrounds the doorway 2, in which a door is adapted to be hinged in the usual manner. Upon this door frame, it will be observed that the weather strips 3 are fixed so as to project into the doorway 2. It will further be observed that the weather strips extend in a continuous manner around the doorway.

Each weather strip 3 preferably consists of a flat strip of sponge rubber with fabric backings 3e vulcanized upon the outer and under faces thereof. This fabric backing 3e imparts an excellent resiliency to the weather strips for deflecting purposes. The under rear portions of the weather strips 3 are reduced or weakened, as by cutting away the underside fabric backing and a portion of the sponge rubber upon a bevel from about a line 3a (Figure 5) to the rear edges of the strips, as shown in Figure 5. This rear reduced base portion of each weather strip is clamped in a metal binding 7 which encloses the rear portion of the strip. Upon its upper face, this binding has a longitudinally extending groove or depression 3b, and forward of this depression is a convexedly curved portion 3c which terminates in a downwardly curved gripping edge or lip 3d that grips and indents the weather strip in a longitudinal line substantially above the line 3a.

The weather strips with their encased margins are shown in Figure 2 as applied to the face of the door frame which is shown as made of sheet metal stampings. The sides and upper and lower faces of the door frame are provided with sloping grooves 4. These grooves 4 slope towards the outer faces of the frame and in directions away from the front part 10 of the door 5. These grooves may be formed in any suitable manner to provide proper lodgments for the encased portions of the weather strips. In forming one of these grooves, the sheet metal is substantially doubled upon itself, as indicated at 6, and the doubled-over edge 6 is slightly curved inwardly for a purpose that will later appear.

The weather strips 3 and grooves 4 are so designed that the upper longitudinal double edges 6 at the throats of the grooves are substantially in registry with the longitudinal indented portions of the weather strips formed by the lips 3d, with the result that when the encased portions of the weather strips are positioned in the grooves, the doubled edges 6 can be clamped tightly against the indented portions of the weather strips to cause the free margins of the strips to assume an angle with respect to the faces of the door frame, as shown in Figures 2 and 4. As the doubled gripping portions 6 at the throats of the grooves are clamped against the indented lines of the weather strips, a tension is imparted to the fabric upon the outer sides of the weather strips causing the free portions to assume and be maintained at an angle. In other words, the free portions of the weather strips are caused to project in the form of deflectable flaps into the doorway 2. The gripping edges 6 also anchor the weather strips in the grooves.

In Figure 3, the door is represented by the reference 5a, and the door frame is indicated by the reference 1a. In this figure, it will be noted that the weather strips 3 are carried by the door instead of by the door frame. In this modified form, the grooves or lodgments for the encased portions of the weather strips are formed in the sheet metal edge faces of the door, including the top, bottom and side edge faces thereof, as in the first form illustrated.

The grooves in the edge faces of the door are similar to the grooves in the door frame. In forming these grooves, the sheet metal is doubled back upon itself, providing a doubled gripping edge 6a at the throat of the groove 4a, as in the first form. This doubled edge 6a performs the same function as the doubled edge 6 in the first form, in that it maintains at an angle the free portion of the weather strip which it engages.

It will be evident that a car door equipped with weather strips involving this invention will provide for any tolerance, will eliminate or materially decrease the jarring effect when the door is closed, and prevent rattling thereof.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a weather proofing structure for excluding the weather between a swinging door and its frame comprising a resilient sponge rubber strip having fabric backings upon its faces and having a base portion, said frame having a sloping groove with the base portion of said strip lodged and secured in said groove, one wall of said groove terminating in a gripping edge engaging said strip and deflecting the free portion at an angle.

2. In a weather proofing structure for excluding the weather between a swinging door and a frame member, a flat sponge rubber strip, a metal casing enclosing the base portion of said strip, said frame member having a sloping groove with a depressable wall portion, the encased portion of said strip being lodged in said groove with said depressable wall portion engaging over and pressing an edge of said metal casing into the strip for causing deflection of the free portion of said strip at an angle toward said door for deflection thereby when the door is closed.

3. In a weather proofing structure for excluding the weather between a swinging closure member and a frame member having confronting faces, a flat reinforced resilient rubber strip having a base portion, one of said members having a groove in its face sloping toward the face of the other member, said weather strip having its base portion lodged in said groove, and one wall of said groove having a depressable portion for engaging and anchoring said weather strip in position and causing the free portion of said weather strip to assume an angle with respect to the base portion.

4. In a weather proofing structure for excluding the weather between a swinging closure member and a frame member having confronting faces in closed position, a flat reinforced resilient rubber strip having a base portion, a metal casing enclosing the base portion of said strip and having a curved edge engaging one side of said strip, one of said faces comprising sheet metal with a groove sloping toward the other face, one wall of said groove terminating in an overhanging depressable curved lip, said rubber strip having its encased portion lodged in said groove with said overhanging lip engaging over the curved edge of said casing and contacting said rubber strip and depressing the same for causing the free portion to assume an angle with respect to the base portion.

5. In a weather proofing structure for doors, a sheet metal frame member surrounding the door way, said frame member having a sloping groove, a resilient reinforced sponge rubber weather strip having a base portion, a metal casing enclosing said base portion and having a curved edge portion engaging one side of said strip, said weather strip having its encased portion lodged in said groove, one wall of said groove comprising a double depressable portion having a curved lip fitting over the curved edge portion of said casing and contacting and depressing said weather strip for causing the free portion of said strip to assume an angle with respect to the base portion.

6. In a weather proofing structure for excluding the weather between a swinging closure member and a frame member, a resilient sponge rubber strip having a fabric facing, a metal casing enclosing the base portion of said strip, said strip being weakened on one side in a zone adjacent one edge of said casing by removal of the fabric facing, a sloping groove in the frame member with a depressable outer edge portion, the encased portion of said strip being lodged in said groove with said depressable outer edge portion engaging over and pressing the other edge of said metal casing into the fabric facing on the other side of the strip for causing the free portion of the strip to assume an angle with respect to the base portion.

7. In a weather proofing structure for excluding the weather between a swinging closure member and a frame member, a resilient sponge rubber strip, a metal casing enclosing the base portion of said strip, said strip having an outwardly extending shoulder portion on one face adjacent an edge of the casing, a sloping groove in the frame member with a depressable outer edge, the encased and shoulder portions of said strip being disposed in said groove with said depressable outer edge engaging over and pressing the other edge of the casing into the other face of the strip substantially opposite said shoulder portion for causing the free portion of the strip to assume an angle with respect to the encased portion.

8. In a weather proofing structure for excluding the weather between a swinging closure member and a frame member, a resilient sponge rubber strip, a metal casing enclosing the base portion of said strip, said strip having an outwardly extending shoulder portion on one face adjacent an edge of the casing, said shoulder portion being weakened by having the fabric facing removed therefrom, a sloping groove in the frame member with a depressable outer edge, the encased and shoulder portions of said strip being disposed in said groove with said depressable outer edge engaging over and pressing the other edge of the casing into the other face of the strip opposite said shoulder portion for causing the free portion of the strip to assume an angle with respect to the encased portion.

DAVID H. HARNLY.